March 22, 1955   J. A. ROLSTON   2,704,604
APPARATUS FOR CLASSIFYING FLAKY MATERIALS
Filed Dec. 5, 1950   2 Sheets-Sheet 1

INVENTOR
John A. Rolston
BY Shreve, Crowe & Gordon
ATTORNEY

INVENTOR
John A. Rolston
BY Shreve, Crowe + Gordon
ATTORNEYS

United States Patent Office 2,704,604
Patented Mar. 22, 1955

2,704,604

APPARATUS FOR CLASSIFYING FLAKY MATERIALS

John Albert Rolston, Asheville, N. C., assignor to The English Mica Company, Spruce Pine, N. C., a corporation of North Carolina Application December 5, 1950, Serial No. 199,290

4 Claims. (Cl. 209—235)

The present invention relates to mineral classification procedures, and more particularly to a process for classifying minerals of a flaky character, such as mica or graphite.

In classifying flaky materials such as mica or graphite, by screening, considerable difficulty is experienced because of clogging or blinding of the screen by the flakes of the material being classified. Because of this fact, the screen capacity of rotary or vibrating screens is severely limited when screening flaky materials as compared to granular materials such as sand. The present invention relates to a method and apparatus by which these flaky materials can be subjected to turbulent conditions in a liquid medium such as water, thereby preventing the flakes from being oriented in such a manner as would cause blinding of the screen surface, and resulting in a very high screening capacity; that is the weight of the flaky material passing through a given area of screen in a given time is much greater than if a rotary or vibrating screen were used.

The desired turbulence in the material is obtainable by flowing a slurry thereof in water into an environment defined by a closed screen in which are mounted rotary impeller and agitator blades which are rotated at high speeds in the slurry. The speed of the agitator blades is such as to produce a turbulent flow condition, thus causing the flakes to be oriented in all possible directions with respect to the screen surface. Being oriented so indiscriminately, the flakes have no chance to turn flat on the screen and cause blinding thereof, but pass through the openings if the flakes are small enough. Larger flakes than the screen openings bounce off the screen and remain in the pulp. Another requirement is that the pressure must remain below five pounds per square inch gage pressure, since higher pressures force the flakes against the screen openings where they cannot be removed by further agitation and therefore blinding the screen.

The invention will be understood more readily by reference to the accompanying drawings, in which.

Figure 1:
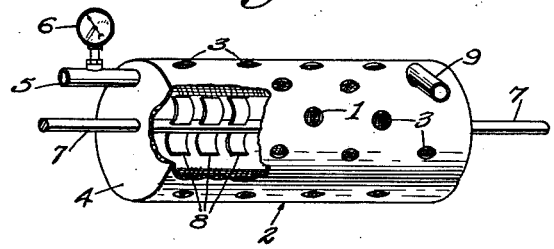
Fig. 1 is a fragmentary perspective view of one form of apparatus adapted to carry out the improved process of this invention.

Referring more particularly to the drawings, and first to Fig. 1, this view shows a cylindrical screen 1 enclosed in a perforated housing shell 2, perforations 3 which enable the classified fines to pass out from the screen to a suitable collecting apparatus, not shown. The ends of the cylindrical screen 1 and enclosing housing 2 are closed by solid end plates, one of which is shown at 4, that is apertured to receive the pulp feed line 5, in which a pressure gage 6 is mounted, and the rotary shaft 7 which carries the agitator blades 8, a plurality of which are spacedly mounted along the shaft 8 within the screen 1 and which are oppositely arcuately curved, as shown in the drawing. The shaft 7 extends completely through and beyond the opposite end closure plates, and the perforated housing 2 is provided with a pulp discharge 9, for discharging the pulp from the screen and housing after separation of the fines therefrom. The perforations 3 in the housing shell 2 are spaced apart a suitable distance and in practice, may be holes approximately one-half inch in diameter, while the screen 1 may be an 80-mesh screen, such being the preferred values, although they are merely illustrative in character, as will be understood.

Figure 2:
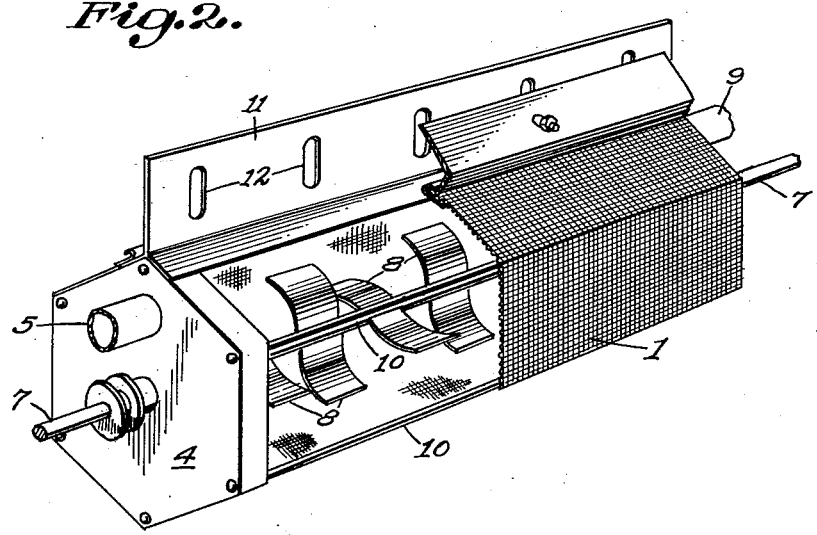
Fig. 2 is a fragmentary isometric view of a somewhat modified form of apparatus, with the outer perforated housing similar to Fig. 1 removed.
Figure 3:
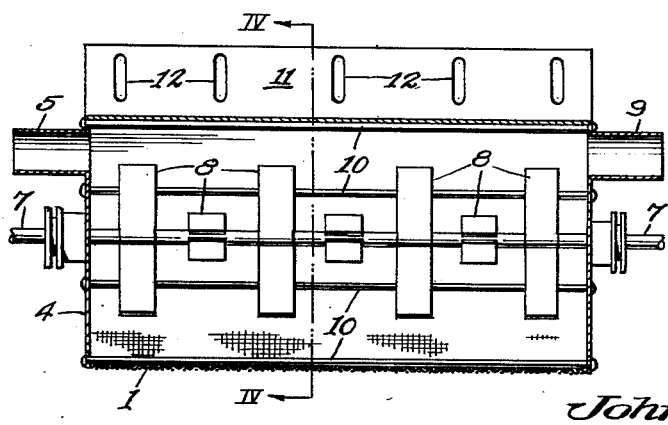
Fig. 3 is a longitudinal vertical sectional view of the equipment shown in Fig. 2.
Figure 4:
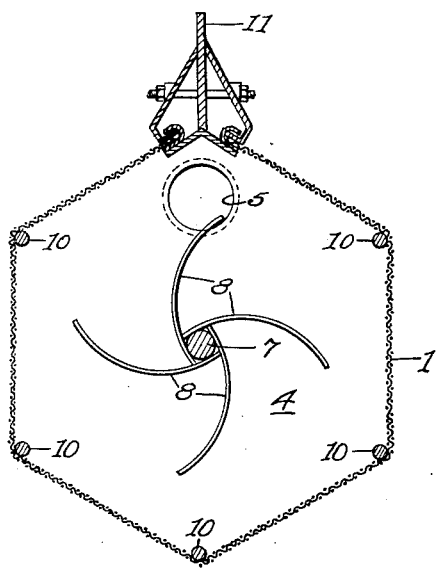
Fig. 4 is a transverse sectional elevation taken on the line 4—4 of Fig. 3, looking in the direction of the arrows.

In the modification of the apparatus shown in Figs. 2, 3 and 4, the screen 1 is shown as being hexagonal in shape, the end closures or heads 4 being suitably held by tie-rods 10, and an upstanding longitudinally extending web 11 is welded to the end closures 4. This web 11 is provided with spaced openings 12 for reception of lifting or suspension means, not shown, for the equipment. The agitator blades 8 are similar to the blades shown in Fig. 1, and the remainder of the apparatus of Figs. 2, 3 and 4 are similar to the form of apparatus shown in Fig. 1, and are indicated by the same reference characters.

Figure 5:
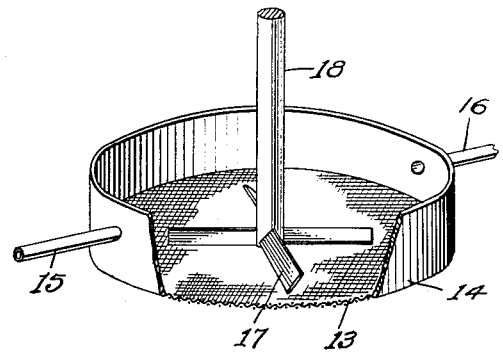
Fig. 5 is a fragmentary perspective view of a further modified form of apparatus suitable for carrying out the improved process.

In the modification shown in Fig. 5, the screen, designated at 13, is a flat sheet, suitably secured to an annular upstanding head 14, the sheet 13 covering the bottom of the upstanding head 14, into which passes the feed pipe 15 and from which leads the discharge pipe 16. The agitation of the pulp is effected by rotation of spaced impeller blades 17, rotation of these blades being effected by rotation of shaft 18 which is mounted vertically to the surface of the screen 13. In operation, a series of these devices is used, the pulp of flaky material being passed successively through each.

Figure 6:
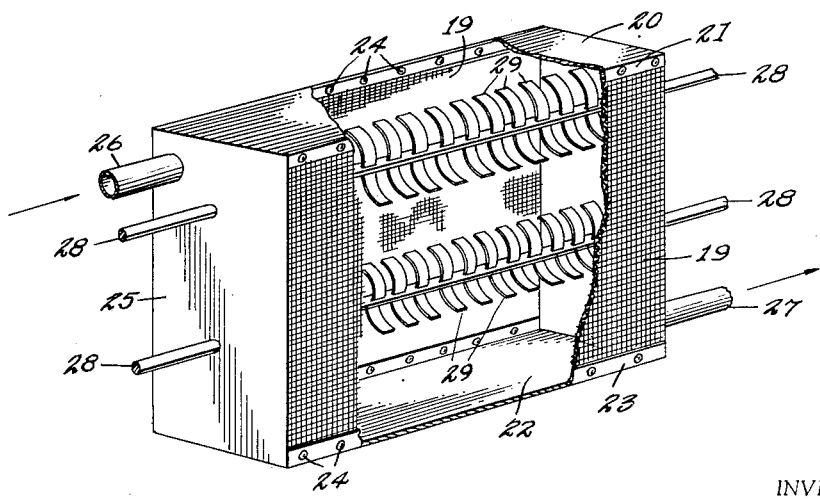
Fig. 6 is a view similar to Fig. 5, but showing a still further modification of operative equipment for the process.

In the modification of Fig. 6, there is shown a construction comprising two flat screens 19 which are mounted vertically a suitable distance apart and maintained vertically parallel by a top plate 20, having downwardly extending flanges 21 and a bottom plate 22 having upwardly extending flanges 23, these flanges 21 and 23 being means for securing the screens 19 in place on the top and bottom plates, securing means being indicated at 24. End closure heads 25 receive intake pipe 26 and outlet 27, as shown. In this modification a pair of agitator means are shown the vertically spaced shafts 28 and 28' carrying the similar spaced impeller blades 29.

From the drawings, it will be seen that the equipment consists essentially of stationary wire cloth screen means in a cylindrical, or other suitable shape, with head members for supporting the screen means. The head means are equipped with suitable size pipes for feed and discharge, and shaft means extending axially through the equipment. Within the confines of the screen means and attached to the shaft means are a number of impeller and agitator blades, rotating in a normal manner. In practice, the shaft means and impeller blades rotate at fairly high speeds of about 1000 R. P. M. The impeller blades, which preferably are of turbine type, do not touch the screen means at any point.

In operation, the feed as a fairly thin slurry (up to about 35% solids) is fed in one end of the screen means by gravity. The impeller blades splash this slurry around and the fines pass through the screen with most of the water and the oversize continues through the screen to be discharged at the opposite end from the feed. In practice, it is found that there is a tendency of excessive wear on screens of very fine sizes (for example, below 100-mesh) but not for 80-mesh or coarser sizes.

The process of the present invention is illustrated by the following specific examples, showing operating data obtained by use of equipment of the type shown in Fig. 1. The housing shell 2 for the screen 1, was perforated with forty-eight holes, each one-half inch in diameter to permit egress of the fine mica and water. The effective screen area (area of the 48- one-half inch holes) was 9.41 sq. in. or 0.0654 sq. ft. The screen size was 80-mesh. The following examples are typical of results obtained with this equipment:

Example I

Feed.—Ground mica was classified, the mica having the following screen analyses:

| Screen mesh: | Per cent on screen |
|---|---|
| 100 | 21.6 |
| 200 | 31.7 |
| 325 | 13.9 |
| Pan | 32.8 |

Impeller speed, 1300 R. P. M. (impeller approximately 3 inches in diameter).
Feed, per cent solids, 15%.
Feed pressure, approximately 1 lb./sq. in.
Feed rate, 131 lbs. dry mica/hr.
Discharge rate (−80 mesh), 51.9 lbs. dry mica/hr. or 794 lbs./hr./sq. ft. screen.
Efficiency (lbs. −80 mesh removed/lbs. −80 mesh in feed)=42%.

Example II

Feed: As in Example No. I.
Impeller speed: As in Example No. I, but in the present example, one impeller blade was fitted with rubber paddles to scrape screen.
Feed, per cent solids, approx. 15%.
Feed pressure, 30 lbs./sq. in.
Discharge rate: Relatively no discharge. Screen appeared to be coated with mica flakes on high pressure side.

Example III

Feed: As in Example No. I.
Impeller speed, 75 R. P. M.
Feed pressure, 90 lbs./sq. in.
Discharge rate: No discharge.

Example IV

Feed.—Ground mica of following screen analysis:

| Screen mesh: | Per cent on screen |
|---|---|
| 80 | 25 |
| Pan | 75 |

Feed, per cent solids, 26%.
Feed pressure: Gravity feed.
Feed rate: Not measured.
Discharge rate, 244 lbs. per hr. or 186 lbs./hr./sq. ft.

Example V

Feed.—Mica and fine sand of following screen analysis:

| Screen mesh: | Per cent on screen |
|---|---|
| 60 | 35.7 |
| 100 | 5.9 |
| Pan | 58.4 |

Impeller speed, 650 R. P. M.
Feed, per cent solids, 8.6%.
Feed pressure, less than 5 lbs./sq. in.
Feed rate, 241 lbs./hr.
Discharge rate (−100 mesh), 99 lbs./hr.
Efficiency (lbs. −100 mesh removed/lbs. −100 mesh in feed)=42%.

It may be pointed out that the use of multiple agitator and impeller blades is preferred over the use of solid blades because it is found in practice that the smaller, multiple blades produce substantially increased turbulence over that obtained by the use of solid blades. In operation, it appears that the results obtained by the present process are dependent upon the creation of vigorous turbulence adjacent to the screen surface in the absence of any pressure conditions, this turbulence causing the fine, flaky mica particles to turn edgeways and flow through the screen, the greater the turbulence, the faster the screening action. It has been found by qualitative tests, that the mica which passes through the agitator screen of the present invention cannot be rescreened through the same mesh size by hand screening in the wet state, but only by high intensity vibrational screening in the dry state and with considerable brushing. In other words, normal wet screening methods will not pass mica particles just smaller than the mesh openings, and dry screening methods will pass these particles only with difficulty. However, the agitator screen of the present invention passes these particles easily. It will also be understood that each of the forms of the apparatus shown in the drawings may be provided, in practice, with a suitable housing shell corresponding to the housing shell 2 of Fig. 1.

It will be further understood of course, that the foregoing description is indicative of typical operations and results attendant upon carrying out the improvements of present invention, but it will be apparent from the foregoing description that both procedural and structural details may be varied without departing from the inventive concept, as determined by the properties of the flaky materials being classified and conditions of operation required or desired to be maintained in any particular application of the invention. Accordingly it will be understood that it is intended and desired to embrace within the scope of this invention such modifications and changes as may be required or desired to adapt it to varying conditions and uses, as defined by the appended claims.

What is claimed is:

1. Apparatus for classifying comminuted flaky materials, which comprises a classifying environment including a classifying screen of known mesh size, head means supporting the screen, means for admitting a slurry of the flaky materials to be classified into the said environment, rotary impeller means mounted in the environment including impeller and agitating blades and rotary shaft means therefor, the said blades extending from the shaft in opposite directions from the shaft and adjacent to the screen but out of contact therewith, oppositely directed blades being in alignment with each other and having oppositely directed and equal curvatures and producing a vigorous turbulence in the slurry adjacent to the screen and projecting the material to be classified against the screen, and discharge means for withdrawing residual material and liquid from the classifying environment.

2. Apparatus for classifying comminuted mica, which comprises a classifying environment including a stationary classifying screen of known mesh size and which has a substantially continuous screen surface of hollow tubular cross-sectional configuration, head members for supporting the screen, feed and discharge means in the head members, the feed means supplying a thin aqueous slurry of mica by gravity into the screen, shaft means extending longitudinally axially through the screen, means on the shaft means for rotating the latter, a multiplicity of separate but closely spaced agitator and impeller blades mounted on the shaft and extending radially therefrom and terminating immediately short of the screen, but within normally viscous boundary layers of the slurry immediately contiguous to the screen to provide a continuous but slight clearance between each blade and the screen, the blades having substantially flat transverse surfaces and longitudinal surfaces curved in opposite directions outwardly from the shaft, the said blades picking up platelet particles of mica from the slurry and impelling the same against the screen, thereby maintaining the particles continuously in suspensions and in random orientation throughout the slurry, such platelet particles of mica having dimensions smaller than the mesh size of the screen and reaching the screen with the said smaller dimension directed towards and in alignment with the meshes of the screen being projected through the screen by the force imparted to the particles by the said blades.

3. The apparatus as claimed in claim 2 in which the mica slurry being classified contains up to approximately 35 percent of the solids, and the shaft and blades having speeds of at least approximately 1000 R. P. M.

4. Apparatus as claimed in claim 3 wherein the screen is a standard 80-mesh screen for passage therethrough of platelet particles of mica having dimensions smaller than 80-mesh and which reach the screen with the smaller dimension directed towards the meshes of the screen.

References Cited in the file of this patent

UNITED STATES PATENTS

| 64,091 | Furnier | Apr. 23, 1867 |
|---|---|---|
| 364,354 | Koch | June 7, 1887 |
| 616,033 | Sturcke | Dec. 13, 1898 |
| 771,557 | Locke | Oct. 4, 1904 |
| 811,930 | Kihlgren | Feb. 6, 1906 |
| 894,879 | Fuller | Aug. 4, 1908 |
| 1,031,832 | Bohn | July 9, 1912 |
| 2,385,162 | Richardson | Sept. 18, 1945 |
| 2,490,129 | Heyman | Dec. 6, 1949 |

FOREIGN PATENTS

| 248,082 | Great Britain | Mar. 1, 1926 |
|---|---|---|